(12) United States Patent
Short et al.

(10) Patent No.: US 7,836,100 B2
(45) Date of Patent: Nov. 16, 2010

(54) CALCULATING AND STORING DATA STRUCTURES INCLUDING USING CALCULATED COLUMNS ASSOCIATED WITH A DATABASE SYSTEM

(75) Inventors: Abigail Elisabeth Short, Redmond, WA (US); Daniel J. Cole, Redmond, WA (US); Matthew Pohle, Bellevue, WA (US); Michael Allen Brotherton, Mooresville, NC (US); Vitore Selca, Bellevue, WA (US); Sumit Chauhan, Sammamish, WA (US); Richard Shawn McDowell, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 391 days.

(21) Appl. No.: 11/924,838

(22) Filed: Oct. 26, 2007

(65) Prior Publication Data

US 2009/0182710 A1   Jul. 16, 2009

(51) Int. Cl.
*G06F 7/00* (2006.01)
(52) U.S. Cl. .................... 707/803; 707/809; 707/796
(58) Field of Classification Search .................. 707/3, 707/100, 204; 705/7; 715/219
See application file for complete search history.

(56) References Cited

U.S. PATENT DOCUMENTS

| | | | |
|---|---|---|---|
| 5,504,848 A | 4/1996 | Yamada | 395/148 |
| 6,961,898 B2 | 11/2005 | Bennett | 715/503 |
| 6,985,895 B2 | 1/2006 | Witkowski | 707/3 |
| 7,099,890 B2 | 8/2006 | Cahill | 707/103 |
| 2004/0103365 A1 | 5/2004 | Cox | 715/503 |
| 2005/0182709 A1* | 8/2005 | Belcsak et al. | 705/38 |
| 2005/0262108 A1* | 11/2005 | Gupta | 707/100 |
| 2006/0136808 A1 | 6/2006 | Chirilov | 715/503 |
| 2007/0130503 A1 | 6/2007 | Voshell | 715/504 |
| 2008/0034281 A1* | 2/2008 | Handsaker et al. | 715/219 |
| 2008/0281835 A1* | 11/2008 | Hirsch et al. | 707/100 |
| 2009/0024677 A1* | 1/2009 | Cheng et al. | 707/204 |

FOREIGN PATENT DOCUMENTS

| | | | |
|---|---|---|---|
| WO | WO02057932 A1 | 7/2002 | |
| WO | WO03098500 A1 | 11/2003 | 17/60 |

OTHER PUBLICATIONS

Yoder, Alan G., et al., "Domain-Specific and General-Purpose Aspects of Spreadsheet Languages," 1997, University of Notre Dame, pp. 1-11, http://www-sal.cs.uius.edu/~kamin/dsl/papers/yoder.ps.

Paine, Jocelyn, "Spreadsheet Algebra," Jul. 2003, pp. 1-12, http://www.j-paine.org/sa.doc.

* cited by examiner

*Primary Examiner*—Pierre M Vital
*Assistant Examiner*—Christopher J Raab
(74) *Attorney, Agent, or Firm*—Merchant & Gould

(57) ABSTRACT

Embodiments are provided to calculate and provide information based in part on a defined expression. In an embodiment, a database system can be configured to include a number of calculated columns as part of a database table structure. The database system can be configured to present a calculated result based in part on a determined result type. In one embodiment, a database system can be configured to enable calculated columns to be defined on a table of a database, wherein a component can be used to evaluate an expression associated with a column calculation to determine a proper result type. The proper result type can be stored and used when presenting a result of the calculation. Other embodiments are available.

20 Claims, 3 Drawing Sheets

CALCULATING AND STORING DATA STRUCTURES INCLUDING USING CALCULATED COLUMNS ASSOCIATED WITH A DATABASE SYSTEM

BACKGROUND

Database systems can be used to maintain large amounts of data and other information. A typical database may include a number of tables for storing data. A particular data type must be specified for a table column and used for each associated row of the table. Constructed queries can be used to obtain information from the database. A query can include a set of instructions which can be used to combine, filter, or sort information contained in one or more tables of a database. Calculated columns can be added to a query to obtain a calculation result based on a formula and data in other columns of those tables or from external data sources, such as user-written code, linked files, and web services for example. Unfortunately, the associated calculation is performed each time the query is executed, and a user typically needs to define the same formula for the calculation multiple times (for example, once in each different query).

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to calculate and provide information based in part on a defined expression. In an embodiment, a database system can be configured to include a number of calculated columns as part of a database table structure. The database system can be configured to present a calculated result based in part on a determined result type. In one embodiment, a database system can be configured to enable calculated columns to be defined on a table of a database, wherein a component can be used to evaluate an expression associated with a column calculation to determine a proper result type. The proper result type can be stored and used when presenting a result of the calculation.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
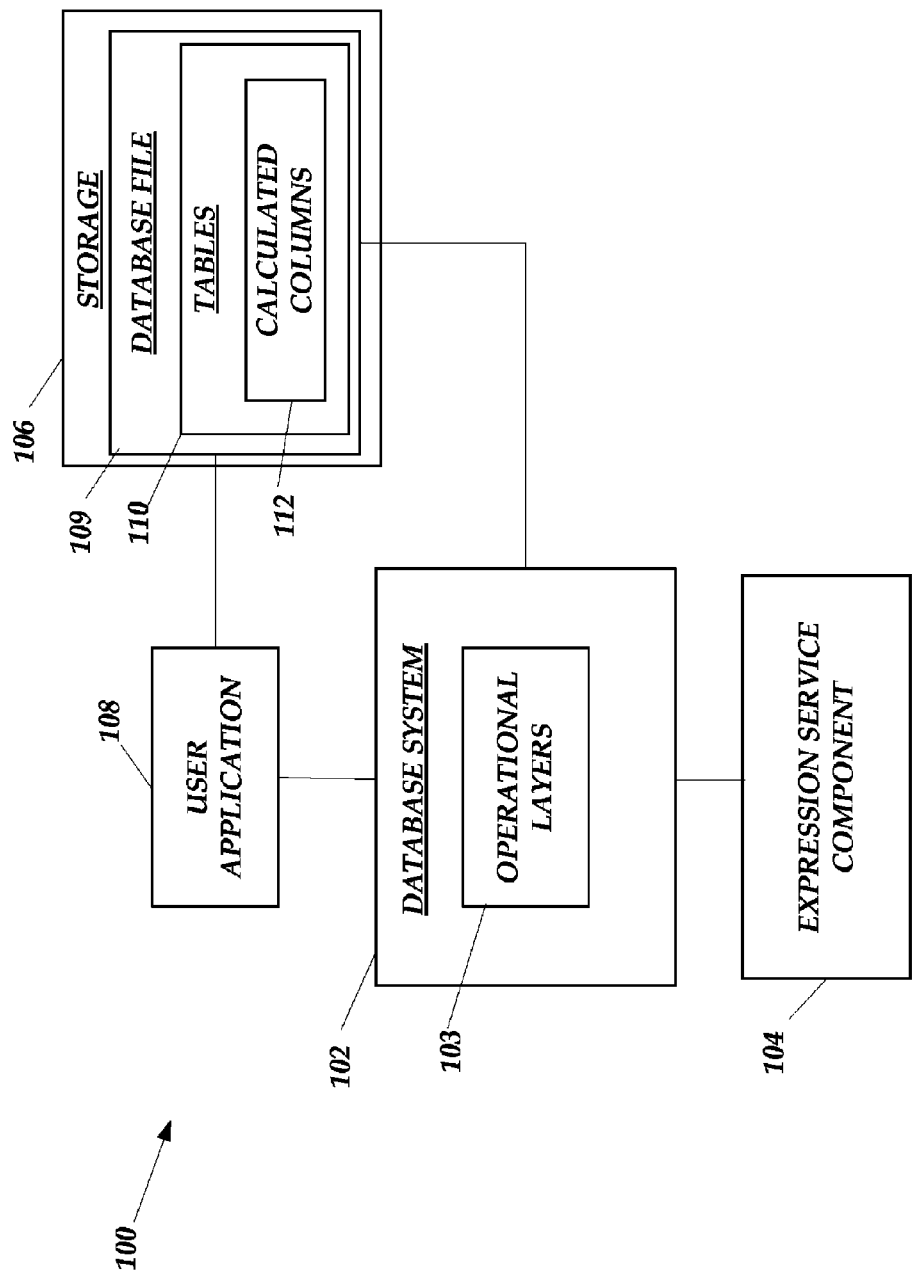
FIG. 1 depicts a block diagram of an exemplary system configured to manage information.

Embodiments are configured to provide information based in part on a calculation associated with a data structure, but the embodiments are not so limited. In an embodiment, a database system can be configured to include a number of calculated columns as part of a table structure. The database system can be configured to provide a result of a calculation based in part on a determined result type. In one embodiment, a database system can be configured to enable calculated columns to be defined on a table of a database. A servicing component can be used to parse an expression associated with a column calculation to determine a proper result type for storing and presenting a result of the calculation. A result of a calculated column can be stored in storage and used by a user using a user application. A result of a calculated column can also be updated if a dependency changes, as described below.

In an embodiment, a system can be configured to use a formula when performing calculations associated with a number of columns of a database table. In one embodiment, a database system can be configured to create a fully functional stored column in a database table based in part on an evaluation of a user-defined formula associated with a calculated column. The database system can be further configured to store and provide a result of an equation, formula, or other data operation based in part on data associated with other columns. By storing the result of a calculation in a data store, an associated calculation or computation does not have to be performed in each instance or whenever the table is opened, but only upon a dependency change, which results in a more efficient process.

In another embodiment, a system can be configured to implement storage at a database engine level, which provides greater flexibility in how to store data and metadata while still maintaining a typed system for presenting data and other information. Stated a different way, the system can operate to serialize data in deeper layers of a database engine, allowing for greater flexibility when storing data and metadata, while not interfering with how users expect to interact with the data in an application.

Various embodiments provide systems and methods which can be configured to include a number of calculated columns as part of a database table structure. Accordingly, a calculated result can be persisted and fetched whenever an associated object, such as an associated table, form, query, report, etc. is referenced, rather than requiring multiple recalculations. Additionally, by including the calculated column with a table, a result may only need to be calculated when dependent data changes and not each time an associated object, such as a table, is opened. A user is also not burdened with having to create and reference a separate view (e.g., a query) to manage calculations, since the table can be directly referenced and used. These and other embodiments are described below, and other embodiments are available.

FIG. 1 is a block diagram of a system 100 configured to manage information, according to an embodiment. As described below, components of the system 100 can be configured to provide information based in part on a calculation associated with a data structure, but the components are not so limited. In one embodiment, components of the system 100 can be configured to define a calculated column without having to define a query, wherein the calculated column can be included as part of a database table. Additionally, results associated with calculated columns 112 can be serialized and stored in a data store. As described further below, recalculations associated with a calculated column occur when dependencies change, rather than each time a database object is referenced, resulting in a considerable performance gain. That is, by storing results of a calculated column, a calculated result only requires recalculating when a dependency, such as a value in another column on which the calculation is dependent, changes.

As shown in FIG. 1, the system 100 includes a database system 102, which includes a number of operational layers 103, an expression service component 104, storage 106, and a user application or interface 108, but is not so limited. As described below, the system 100 includes functionality to use user-defined expressions associated with a number of calculated columns 112 to present values (e.g., Boolean, integer, decimal, text, etc.), error codes, and/or other information to an end-user.

The database system 102 can include functionality to manage information associated with various databases, including relational, multi-dimensional, or other data repositories, and includes data management and other functionality. For example, the database system 102 can comprise one or more serving computers and associated storage capacity, such as one or more standard query language (SQL) servers. In an embodiment, the database system 102 includes a database engine having a number of functional layers for performing various operations. The database system 102 can be used in conjunction with various information, including objects, attributes, values, functions, formulas, equations, etc.

The expression service component 104 can be used in conjunction with the database system 102 in various ways. In an embodiment, the expression service component 104 can be used to evaluate an expression to determine a result type and/or calculate a result associated with the expression. For example, the expression service component 104 can operate on a string of expressions (e.g., column one plus column two), tokenize the string of expressions, and perform calculations based in part on the tokenized string of expressions. A token can be described as the smallest meaningful element of an expression. For example, tokens can be various mathematical operators, text strings, functions, or columns in a table. In one embodiment, the database system 102 can include the functionality of the expression service component 104.

The expression service component 104 can also classify a tokenized string of expressions into a tree to determine an execution class for the string of expressions. For example, the expression service component 104 can operate to parse a formula into constituent tokens and bind each token for use by the database system 102 to provide a value. Continuing with the example, the expression service component 104 can also evaluate the formula when each bound token returns a result with a type and a value. Thereafter, the expression service component 104 can return errors, calculated results, and/or data types of calculated results.

In one embodiment, the expression service component 104 can be used to parse user expressions, such as formulas, equations, functions, and other operations, to determine a proper result type for storing to storage 106 and presenting a result of a calculation to a user using a user interface (UI), such as the user application 108. The expression service component 104 can parse a user formula to determine the most concise presentation type for presenting a formula result to a user. That is, the expression service component 104 can choose the smallest data type that can still hold all the precision of the most precise constituent values. For example, an integer plus a floating point number will yield a result type of float, because floating point numbers are more precise than integers. A byte plus an integer will yield a result type of integer because integers can hold larger values than bytes and are thus more precise. Data types that are valid in a tree include bit (e.g., true/false), byte, short integer, long integer, single-precision floating point, currency, date/time, double-precision floating point, decimal, and other representations.

The database system 102 can use information provided by the expression service component 104 to alert a user of various circumstances, including circular references and other error conditions. Moreover, in certain cases, the expression service component 104 can operate to manipulate a data type based in part on the underlying expression and/or calculation result. For example, the expression service component 104 can evaluate a user-defined formula and return a result type (e.g., bit, byte, short, number, float, date/time, globally unique identifier (GUID), text, etc.) which the database system 102 can use when providing a result of a calculated formula per column to an end-user.

The expression service component 104 can also be used by the database system 102 to return a result in any type that a user asks for. In such a circumstance, the expression service component 104 can first determine what the default result type would be, based in part on a column type hierarchy associated with the expression service component 104. Once the default result type has been determined, a user may in turn specify a different result type as another column property (the first column property being the expression itself).

The database system 102 will then convert the result from the default type returned by the expression service component 104 into the type the user desires and present that result type to the user when the user application fetches data from a calculated column. This conversion can occur using the expression service component 104 or other existing application programming interface (API) calls, such as VariantChangeType as an example. For example, the user can have an integer field Num and a floating point field Single and a formula to add the integer and floating point fields. The result type of Num added to Single would normally be of type single-precision floating point, because that is the most precise type of the values being referenced, but the user could specify an integer result.

The database system 102 would convert the answer (using in this case either rounding or truncating, for example) and return that answer to the user. The expression service component 104 can also be used by the database system 102 to provide feedback to a user, such as a dialog box or an error code, when they create an expression that has a circular reference. As an example, the expression service component 104 can parse a formula to determine if the formula depends on a value that itself depends on the column associated with the expression being changed (i.e., a circular reference).

The expression service component 104 can also be configured to validate a defined expression to ensure that the expression is valid and functionally operational for use by the database system 102 when performing operations associated with a calculated column. As described below, components of the system 100 allow for a simplified model to be used by users when calculating and storing a result associated with an expression and a calculated column.

The storage 106 can be used to store information associated with the database system 102, but is not so limited. As described below, the storage 106, such as disk storage or other dedicated store, can be used to store information associated with a number of calculated columns 112. In one embodiment, the storage 106 can be included with the computing device that a user is using to execute the user application 108. In another embodiment, storage 106 can be implemented as dedicated storage on another computing device, including a remote server or file share for example. Storage 106 can also be implemented as a temporary RAM storage where data can be maintained in memory and removed when the user closes the user application 108.

The storage 106 can be configured to store a result of a calculation of an expression and an associated calculated column. In an embodiment, the storage 106 can be configured to store additional information, such as metadata, when storing a result of a calculation or evaluation associated with a defined expression using a serialized storage format. For example, the database system 102 can operate to store errors, result data, and metadata to the storage 106 using a serialized binary format. In one embodiment, the database system 102 can include additional information, such as an identifier, when storing a calculation result to storage 106 as part of a serialized format. For example, the database system 102 can include a time/date stamp to identify when a result has been updated. The time/date stamp can be encoded and associated with a calculation result when storing the calculation result to storage 106.

The database system 102 can also be configured to provide an error or error code resulting from an evaluation, which can also be stored to storage 106 and ultimately presented to an end-user. Correspondingly, the database system 102 can operate to provide error conditions for each column, per cell or field. As a result, the end-user can take actions to correct any errors based on a presented error or error code. As described above, the storage 106 can be included as part of the computing device executing the user application 108 or database system 102, or it can be implemented as a separate component for use by the database system 102 and/or user application 108.

In an embodiment, the user application 108 can be configured as a database application (see database application 24 of FIG. 3), such as the ACCESS® database application, and can be used to interact with the database system 102. In another embodiment, the user application 108 can be configured as an application programming interface (API) or other interactive interface and used with the database system 102 to interact with various database objects and other information. In one embodiment, a user can use the user application 108 to define a number of calculated columns 112 with associated expressions, wherein the calculated columns 112 and associated expressions can be implemented as additional columns of a table of the database file 109. Accordingly, the table can be configured to include additional columns associated with the expressions.

Once defined, the database system 102 can operate to call on the expression service component 104 to perform evaluation and calculation operations based on an associated expression. After the expression service component 104 performs any evaluation and calculation operations associated with an underlying expression, the database system 102 can return the calculated results and any other information, which can be displayed as a column in a user interface, such as a database application. The database system 102 can also store an associated value, metadata, and other information to storage 106 as part of a serialized storage format. For example, the database system 102 can provide an error code and a calculated result to storage 106 if the result of a calculation is an error. The database system 102 can use one or more application programming interface (API) functions (e.g., ReadFile and WriteFile) when storing information, including calculated results, to a file.

A file may include a number of pages and records, including results associated with an expression and an associated calculated column. In one embodiment, a database file can be segmented into pages of a distinct size (e.g., 4 KB). The start of a page can include a number of bytes which may be used to describe a type of page (e.g., database header page, table header page, data page, etc.) and metadata information. For example, a table header page can include metadata to describe the columns that are part of the table, how large the columns are (which helps determine offsets into a data record), how much free space is left on the page, etc. Subsequent data pages can be used by a table to store data records.

Storage 106 can include a number of database files 109 which can include a number of tables 110. The tables 110 can be written out on data pages that are filled with records. The records can be configured as a number of bytes for storing the data for columns in a particular row. For example, in a table containing two columns, one of type text and one of type integer, the record could be composed of up to 510 bytes to hold the text and 4 bytes to hold the integer.

When updating a particular row in a table, user data can be passed down to an operational layer, such as a cursor layer. The operational layer can be used to perform various operations between the database system 102 and the storage 106. For example, the operational layer can be used to allow movement through a table, including information such as which record is the current position. The operational layer can also operate to read/write pages from storage 106, and the database system 102 can perform a search to find the page and then the particular record that is being changed. The operational layer can further be used to delineate which record is currently being read or edited. For example, if a user is adding a new row, as opposed to editing an existing row, a new record can be added on the last data page currently owned by the table. Correspondingly, for a row being edited, data in the record can be replaced and then the page can be written back out to storage 106, using the WriteFile API, for example.

In an embodiment, the database system 102 can set a bit in a table header page when writing column definitions to storage 106, wherein the bit indicates that a column is of a calculated column type. Thereafter, when the table is opened or referenced, an associated layer can interpret the table metadata and recognize that it includes a calculated column. Based in part on this information, the database system 102 can operate to create a calculated column representation in memory to operate with the calculated column structure stored with each record. In one embodiment, the database system 102 can use a serialized binary format that corresponds with the calculated column data structure.

The database system 102 can use the calculated column representation when performing operations associated with a calculated column data structure. For example, the database system 102 can be configured to recognize that a calculated column data structure begins with metadata about errors, followed by a last update time, a result size, and data. The database system 102 also can operate to retrieve a property from a system table that describes a data "type" that is stored in the calculated column data structure (e.g., text, integer, etc.). The calculated column representation can also be used to manage writing out data and/or metadata by using the foregoing information of the calculated column data structure.

As described above, a serialized format can be used when writing to and reading from storage 106. Accordingly, the information stored as part of the serialized format can be included with an associated record. An example can be used to describe the process. Assume that a table includes a text field, a number field, and a calculated column that can operate to return a number based on the number field (e.g., NumberField*2). If a value in the NumberField column is updated, the database system 102 can examine the table to determine if there are any calculated columns 112 that depend on the updated number. The database system 102 can determine this information when a table is first opened by using the expression service component 104 to examine or evaluate all of the calculated columns 112, including determining which column(s) in the table each expression references. Thereafter, the database system 102 can store the evaluation information as an in-memory structure.

Continuing with the example above, since the calculated column depends on this number field, the calculated column representation can be notified that the number column has changed, and the expression service component 104 can be used to recalculate the calculated column for the associated record/row. For example, the operational layer that created the in-memory calculated column representation can maintain a list of dependencies, so that when a NumberField has been updated, the database system 102 can pass the record information to the calculated column which can be recalculated based on the updated value.

Upon retrieving a result from the expression service component 104, the calculated column representation builds up the structure to be serialized (e.g., error info, time stamp, calculated value) and then uses the information from the cursor layer to find the particular part of the record (the offset into the record to ensure that this is written after the text field and number field) and copies the bytes of this structure to storage. Thereafter, the built-up structure can be stored to storage 106 by writing out its associated page.

After storing the information to storage 106, a user can use the user application 108 to further interact with a stored calculation result and any associated information. Alternatively, the database system 102 can push a calculation result to the user application 108. As described below, a translation process can be used to translate the calculated result from a serialized format to a presentation format for presenting the result in the user application 108 or some other UI.

As used herein, a table refers to a database table and any other tables that contain application or user data. A table can be saved permanently to storage 106. While one table is described above, the database system 102 can include a plurality of tables. For example, a user can use the user application 108 to create a new table column in a table based on a formula or other expression. The user can use the user application 108 to provide the new table column and associated expression to the database system 102.

Thereafter, the database system 102 can use the new table column and associated expression as part of a calculated column operation. The user application 108 can also be used to define queries, add records, retrieve records, edit records, etc. As described further below, the user application 108 can also retrieve translations associated with a result of an expression evaluation from storage 106. The user application 108 can also include other functionality and is not limited to any embodiments or examples described herein.

In certain cases, it may be practical to validate a submitted expression. For example, a user may want to ensure that a submitted formula will return a valid and correct result. In an embodiment, as part of a validation process, the database system 102 can call on the expression service component 104 to validate a submitted expression. In one embodiment, the expression service component 104 can operate to validate an expression by: 1) checking that the syntax of the expression is correct (e.g., no missing parentheses), and/or 2) checking that any dependencies (e.g., values, fields, functions, etc.) referenced by the expression are valid.

The expression service component 104 can operate to validate an expression when parsing the expression into tokens, or the smallest individual parts of an expression. Some tokens, such as parentheses and other mathematical operators, can be recognized by the expression service component 104. Other tokens can be passed to the database system 102, which can operate to check whether they belong to recognized functions. If the database system 102 does not recognize a token as a function, then it can check to see if the token is a column. In an embodiment, each token is first passed through the expression service component 104 and then through the database system 102 to see if it is valid. In other embodiments, the validation process can be skipped and the database system 102 can communicate to the user application 108 that an error is present with a calculated column and the user application 108 can then display the error to the user.

After ensuring that an expression is syntactically correct, the expression service component 104 can also operate to check to make sure that all tokens reference valid columns and that adding a column would not create a circular reference (dependency cycle). In one embodiment, the database system 102 can use a depth-first search of a reverse dependency mapping to determine if there are any circular references or other issues. For example, the database system 102 can maintain a mapping of each field to the fields that depend on it (reverse dependencies). The expression service component 104 can pass each token in the expression to the database system 102, which can check whether it recognizes the token as a valid field. If the field is already in the list of dependencies for the expression being evaluated, the database system 102 can return an error; otherwise, it can add the field to the list and let the expression service component 104 continue validating the expression. If the field token has other dependants (based on the list already formed for them), then the database system 102 can check those dependants using the same method.

As an example, assume two number fields, A and B, and a number of calculated columns: Calc1, Calc2, and Calc3 shown in Table 1 below.

TABLE 1

| Field | Calculation |
| --- | --- |
| Calc1 | A + B |
| Calc2 | A * B |
| Calc3 | Calc1 + Calc2 |

The dependency mapping is shown in Table 2 below.

TABLE 2

| Field | Dependencies |
| --- | --- |
| Calc1 | A, B |
| Calc2 | A, B |
| Calc3 | Calc1, Calc2 |

The reverse dependency mapping, or the mapping of a field to its dependants, is shown in Table 3 below.

TABLE 3

| Field | Dependants |
| --- | --- |
| A | Calc1, Calc2 |
| B | Calc1, Calc2 |
| Calc1 | Calc3 |
| Calc2 | Calc3 |

Continuing with the example, assume that a user then tried to change Calc2 to be Calc1*Calc3. In one embodiment, one of the operational layers 103, such as a cursor layer, can operate to check references by adding Calc2 to the list of dependencies (since a column should not reference itself), but does not add dependants associated with Calc2. Then, the cursor layer can add Calc1 as the first dependency. Calc1 has a dependant, Calc3, which the cursor layer also adds to the list. Then, the cursor layer operates to look up Calc3's dependants, which are none for this example.

Thereafter, the cursor layer can operate to further evaluate the new expression and check the next field, Calc3. Since Calc3 is already included in the list, the cursor layer determines that a circular dependency exists (updating A would update Calc1, which would update Calc3, which would update Calc2, which would update Calc3 . . . ). Thus, the cursor layer can provide an error and disallow the change to Calc2. If the validation does not result in an error, the database system 102 can continue processing the new calculated column.

The database system 102 can cache the parsed expression, add dependency and reverse dependency mappings, and return the right type to the user application 108. Thereafter, the database system 102 can perform a recalculation from a top layer once column creation has succeeded. In the example above, updating field A would first update A's dependants, Calc1 and Calc2; then update Calc1's dependants (Calc3, in this case); then update Calc2's dependants (in this case no work, since Calc3 has already been updated).

The system 100 can be implemented as part of networked, distributed, or other computer-implemented environment. The system 100 and its components can communicate via a wired, wireless, and/or a combination of communication networks. A number of client computing devices, including desktop computers, laptops, handhelds, and/or other smart devices, can interact with and/or be included as part of the system 100. In alternative embodiments, the various components can be combined and/or configured according to a desired implementation. Moreover, one or more components of the system 100 can be implemented either in hardware or software. Also, while certain embodiments include software implementations, they are not so limited and may encompass hardware, or mixed hardware/software solutions. Other embodiments and configurations are available.

Figure 2:
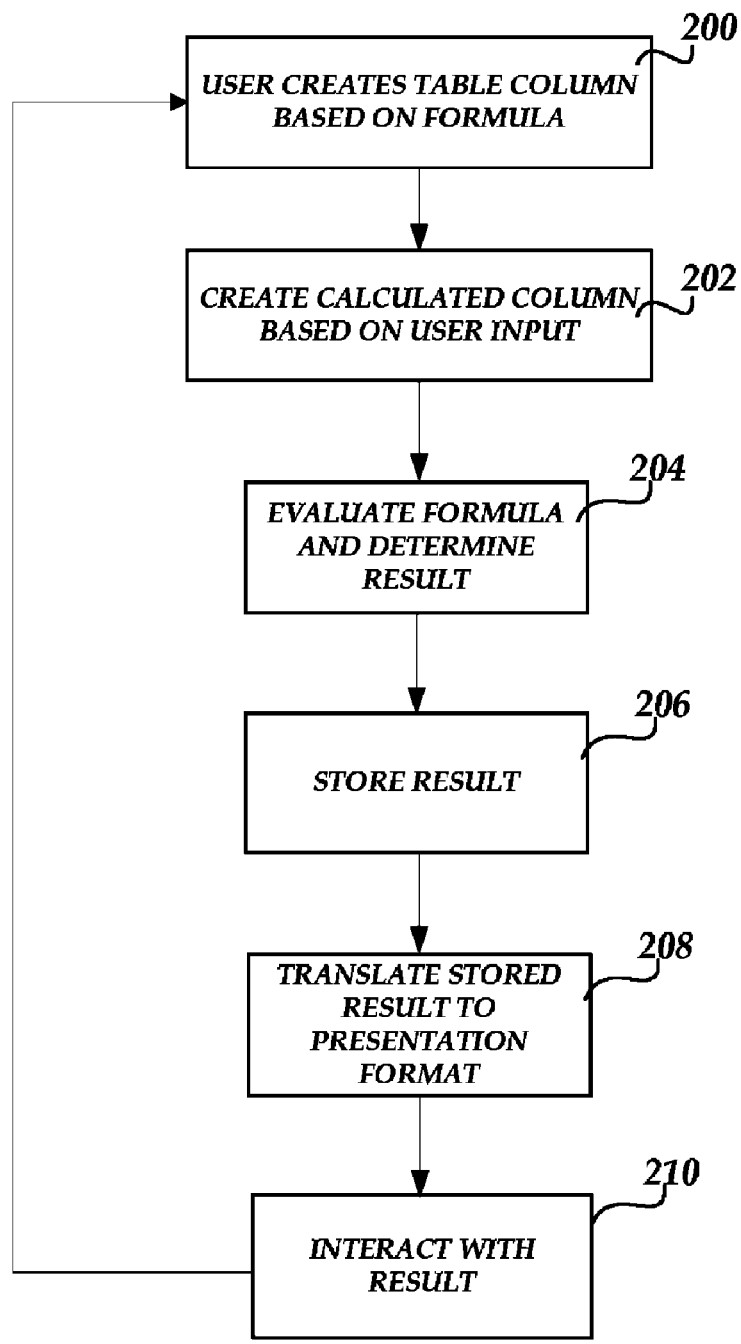
FIG. 2 is a flow diagram illustrating an exemplary process of providing information.

FIG. 2 is a flow diagram illustrating a process of providing a result to an end-user based in part on an evaluation of a formula associated with a calculated column or columns, under an embodiment. The components of FIG. 1 are referred to in the description of FIG. 2, but the embodiment is not so limited. At 200, a user can use the user application 108 to create a new calculated table column based on a formula, wherein the formula may reference other information in storage 106 or associated with the database system 102. For example, a user-defined formula may reference a cell that depends on its own formula.

The database system 102 can operate to ensure that a created calculated column uses correct data before the calculated column is used. The database system 102 can also be configured to ensure that calculated columns 112 contain valid data before the associated table is available to other situations, such as using a query or a bound form to retrieve data from the table. In one embodiment, when a calculated column has been added to a table (e.g., when the user has defined a new calculated field and upon closing the table chooses "Save changes"), a table API can be called which can calculate the results for the associated calculated column in all table rows.

As part of the creation of a new table column, a user may define a formula that refers to another column or a group of cells. For example, a defined formula may reference other fields in the table (e.g., Value=Quantity multiplied by Price, where Quantity and Price refer to existing table columns). In such a case, for each row, the value of "Value" is the product of the value of Quantity and the value of Price in the associated row. A formula for a calculated column may reference any field or function the database system 102 can interpret, such as Visual Basic® (VBA) methods, columns in other tables, and/or user-defined functions.

Once the user has created a new table column based on a defined formula, the user can use the user application 108 to submit or provide the formula to the database system 102. In one embodiment, the user application 108 can use a data structure defined as a column definition, and the formula can be passed along to the database system 102 as one member of the data structure. In an alternative embodiment, the user application 108 can be configured to specify a web service call when submitting a formula to the database system 102. A web service call can be described as a call to an API provided on the Internet or over a network, through any of a number of communication protocols (e.g., REST, SOAP, http, etc.).

These calls may be static or may allow the caller to provide parameters to refine a result. The result of a web service call can be stored in a calculated column. Parameters associated with a web service call may be any information associated with an expression (e.g., a regular column, another calculated column, a constant, etc.) For example, certain database applications, such as the user application 108, include an application function that can obtain web service information. By using the application function in a formula, a user can specify a column as the input and have a value of the column sent as a parameter to the web service call, and use the result of the web service call when evaluating the formula.

At 202, the database system 102 creates the calculated column based in part on the defined formula and adds the calculated column to a table. In an embodiment, the database system 102 can set a bit in a table page when creating column definitions, wherein the bit can be used to indicate that a calculated column corresponds with a calculated column type. When the table is opened or referenced, a interpreting layer can interpret the table metadata and recognize that it includes at least one calculated column. In one embodiment, as part of the creation process, the database system 102 can create a representation in memory to operate with the calculated column structure. The database system 102 can use the representation when performing operations associated with a calculated column data structure. For example, the database system 102 can be configured to recognize a calculated column data structure, including descriptive metadata about the data structure.

At 204, the database system 102 calls on the expression service component 104 to evaluate and return a calculated result associated with the formula. For example, the expression service component 104 can include and use an "Evaluate" function to evaluate a formula, including evaluating dependencies and any changes to one or more dependencies. In one embodiment, when a value of a column on which a calculated column depends changes, the calculated column representation created in memory receives a notification from the database system 102. The database system 102 can be configured to keep track of dependencies and changes thereto, and can provide a notification when a dependency change is detected. As part of the evaluation, the database system 102 can provide any additional information that the expression service component 104 may require for the evaluation. For example, the database system 102 may provide data associated with another column or a particular function for use in the evaluation.

As further example, the database system 102 can be called to provide information to the expression service component 104 when encountering a formula parameter (e.g., the name of another column in the table) that the expression service component 104 does not understand. Thereafter, the database system 102 can operate to look up the information and provide the same to the expression service component 104. For example, the database system 102 can operate to look up a value of a column based on the current row being evaluated (which was provided to the expression service component 104 at the start of the evaluation process). The database system 102 can then return the value to the expression service component 104 so that it can continue evaluating the result of the formula. In an alternative embodiment, the functionality of the expression service component 104 can be included with the functionality of the database system 102.

At 206, the database system 102 calls on the expression service component 104 to perform a calculation associated with an underlying formula. Alternatively, as described above, the database system 102 can include the functionality of the expression service component 104 and can perform the associated evaluation and calculation operations. Thereafter, the database system 102 can operate to store a calculated result and/or other information as provided by the expression service component 104 to storage 108. For example, the database system 102 can also store additional information or metadata associated with the formula and/or a calculation to storage 108 as part of the calculated column of the table. In one embodiment, the database system 102 can operate to store the calculated result and/or any additional information to storage 108 using a serialized binary format.

For example, the database system 102 can operate to store a calculated result including a temporal parameter, such as a time stamp, to track or identify when the result was updated or first calculated. The database system 102 can also store information associated with a size of a resulting value. In some cases, the database system 102 can also store an error or error code to storage 108, such as in a serialized binary format, when the formula is determined to be improper or otherwise invalid or the result cannot be determined. As further example, the database system 102 may store information according to a serialized format, wherein the first four bytes hold an error code (which can be used when evaluation fails, so that a useful error can be returned to the user); the next eight bytes hold a timestamp for when a result was calculated; the next four bytes hold the size of the result immediately following; and the remaining bytes hold the calculated result.

At 208, the database system 102 can operate to translate the stored result from the serialized format to a presentation format for use by the user application 108 when presenting the calculated result to the user. In one embodiment, the translation process depends on the knowledge of the serialized format used to store the information. For example, the database system 102 can write out data in a certain order, so that it can make similar assumptions when reading the data. At 210, the user application 108 can operate to retrieve the translated result from the database system 102 for presenting the translated result to the user. Alternatively, the database system 102 can automatically push the translated result to the user application 108 for display and interaction therewith. The above-described in-memory calculated column representation can be used to manage writing out data and/or metadata by using the information associated with the calculated column data structure.

While certain embodiments, configurations, and examples are described herein, other embodiments and implementations are available.

Exemplary Operating Environment

Figure 3:
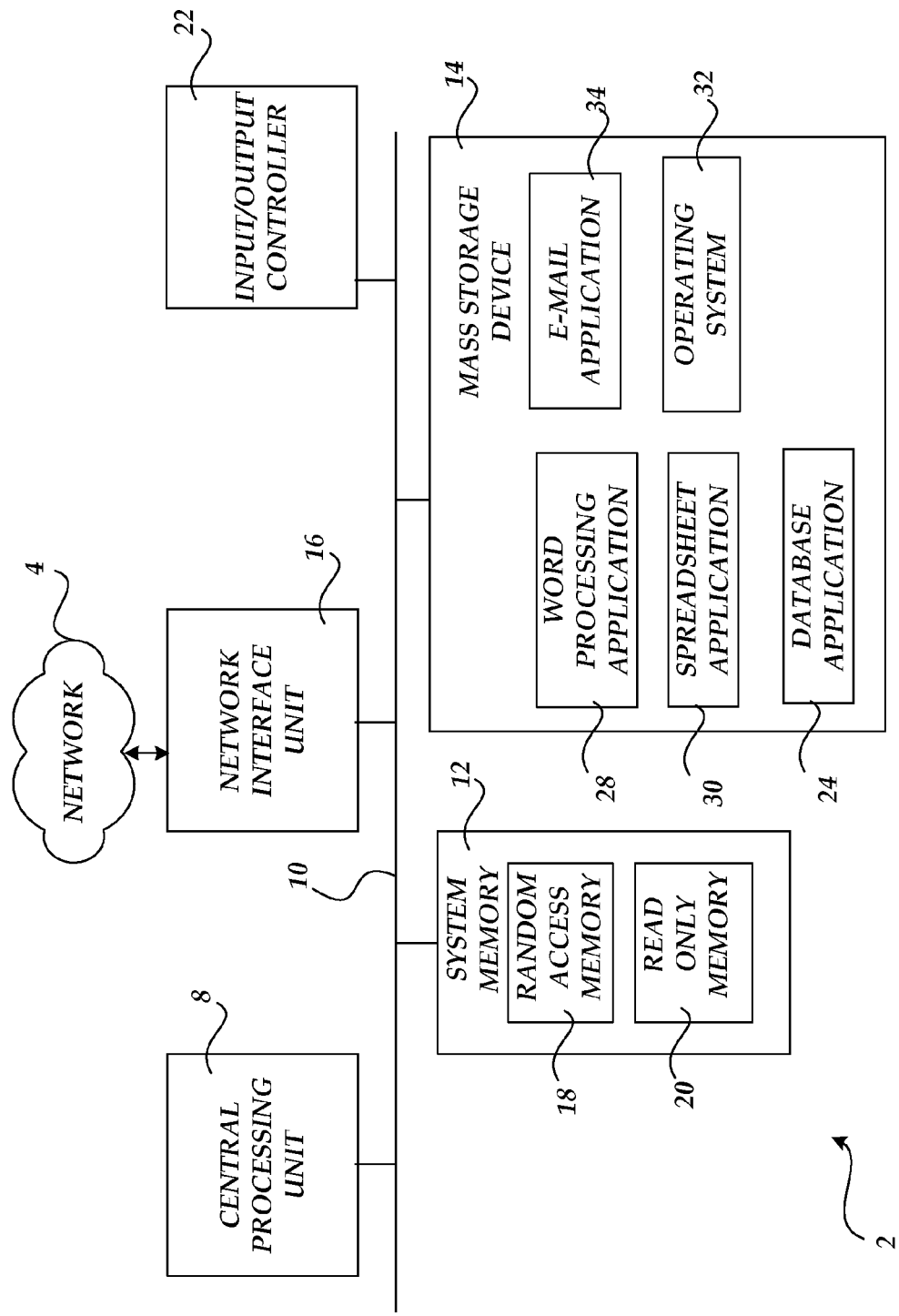
FIG. 3 is a block diagram illustrating a computing environment for implementation of various embodiments described herein.

Referring now to FIG. 3, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 3, an illustrative operating environment for embodiments of the invention will be described. As shown in FIG. 3, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a word processing application 28, a spreadsheet application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A system to manage data, the system comprising:
a database system configured to manage operations associated with the data and other information, the database system including a number of operational layers to operate and use: an expression associated with a calculated column data structure which is included as part of a database table, a depth-first search of a reverse dependency mapping associated with each calculated column, and a serialized format that corresponds with the calculated column data structure and an operational layer to interpret metadata to recognize a calculated column, including error information, a last update time, a result size, and a calculated value, wherein one of the number of operational layers is used to maintain a list of dependencies associated with the calculated column data structure;
an expression service component configured to evaluate the expression and provide a result and other information associated with the result and expression, an evaluation based in part on parsing the expression into tokens to check that the tokens reference valid columns and to pass certain tokens to the database system to check correspondence with recognized functions; and,
a storage to store the result and information associated with the result.

2. The system of claim 1, wherein the expression comprises a formula including one or more dependencies associated with one or more table columns and the expression service component can evaluate the formula to provide a calculated result for each row associated with the database table, the database system further uses the depth-first search of the reverse dependency mapping as part of determining circular references associated with each calculated column.

3. The system of claim 1, wherein the calculated column data structure comprises a column of a table in a database and the database system operates to cache a parsed expression, add reverse dependency mappings, and return a result type for an associated calculated column.

4. The system of claim 2, wherein the database system can cause the recalculation of a calculated column if a dependency associated with the calculated column changes, including providing a default result type associated with the calculated column.

5. The system of claim 1, wherein the database system is further configured to use the serialized format to write the result and information associated with the result to the storage including using a serialized binary format that corresponds with the calculated column data structure and the operational layer to interpret the table metadata.

6. The system of claim 1, wherein the database system is further configured to provide the result to a user application after translating the result from the serialized format, a provided result optionally resulting from a conversion of a calculated result to a user-specified result type.

7. The system of claim 5, wherein the database system is further configured to write the result and a temporal indicator to indicate when the result was calculated to the storage.

8. The system of claim 5, wherein the database system is further configured to write the result and an error associated with a formula evaluation to the storage.

9. The system of claim 5, wherein the database system is further configured to write the result to the storage as a table property.

10. The system of claim 1, wherein the expression service component is further configured to evaluate a formula associated with a calculated column, wherein the evaluation includes determining a presentation type to present the result in a user interface, wherein each presentation type is based in part on a smallest data type having a most precise value.

11. The system of claim 1, wherein the expression service component is further configured to validate the expression by parsing the expression to ensure that the expression returns a valid and correct result.

12. The system of claim 11, wherein the expression service component is further configured to validate the expression by checking for proper syntax.

13. The system of claim 1, wherein the database system is further configured to validate the expression by checking for properly referenced dependencies.

14. A computer-readable storage medium including executable instructions which, when executed, manage data by:
defining a calculated column based on an expression, the calculated column defining a calculated column data structure;
parsing the expression into tokens;
checking that the tokens reference valid columns;
checking to determine correspondence of certain tokens with recognized functions;

maintaining a list of dependencies associated with the calculated column;

creating the calculated column by including the calculated column as a column of a table and the formula as a member of a column data structure;

calculating a result of the expression associated with the calculated column;

persisting the result using a serialized storage format, wherein the serialized storage format can include a calculated value and information associated with the calculated value of the calculated column including using a depth-first search of a reverse dependency mapping associated with each calculated column, and a serialized format that corresponds with the calculated column data structure and an operational layer to interpret metadata to recognize each calculated column, including error information, a last update time, a result size, and the calculated value; and, fetching the result when referencing an associated object without having to recalculate the result associated with the calculated column unless an associated dependency changes.

15. The computer-readable storage medium of claim 14, further comprising validating the formula by parsing the formula to ensure that the formula returns a proper result.

16. The computer-readable storage medium of claim 14, further comprising determining whether a dependency associated with the calculated column creates a circular reference.

17. The computer-readable storage medium of claim 14, further comprising using a web service call to communicate the calculated value of the calculated column as a parameter when evaluating the expression.

18. A method of managing data comprising:

creating a calculated column associated with a database, wherein the calculated column includes an expression;

parsing the expression into tokens to check that the tokens reference valid columns of the database;

passing certain tokens to a database system to check correspondence with recognized functions, the database system including a number of operational layers to operate and use: the expression, a depth-first search of a reverse dependency mapping associated with each calculated column, and a serialized format that corresponds with a calculated column data structure and an operational layer to interpret metadata to recognize a calculated column, including error information, a last update time, a result size, and a calculated value;

receiving a formula associated with the calculated column, wherein the calculated column comprises a column of a table of the database;

evaluating the formula including any dependencies associated with the formula;

maintaining a list of dependencies associated with the calculated column; and, storing a result of the evaluation to a storage medium using a serialized storage format, wherein a time can be included as part of the serialized storage format to identify when the result was evaluated.

19. The method of claim 18, further comprising including the formula in the table as a column property.

20. The method of claim 18, further comprising including a result type in the table as a column property or as part of other table metadata.

* * * * *